United States Patent
Esguerra et al.

(10) Patent No.: US 9,330,066 B2
(45) Date of Patent: May 3, 2016

(54) DYNAMIC DISPLAY METHOD OF MULTI-LAYERED PDF DOCUMENTS

(71) Applicant: KONICA MINOLTA LABORATORY U.S.A., INC., San Mateo, CA (US)

(72) Inventors: Ma Kharisma Esguerra, San Mateo, CA (US); William Chang, Mountain View, CA (US); Akinori Yamamoto, Santa Clara, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 336 days.

(21) Appl. No.: 13/926,842

(22) Filed: Jun. 25, 2013

(65) Prior Publication Data

US 2014/0380143 A1     Dec. 25, 2014

(51) Int. Cl.
G06F 17/21     (2006.01)

(52) U.S. Cl.
CPC .................... *G06F 17/211* (2013.01)

(58) Field of Classification Search
CPC .................................................. G06F 17/211
See application file for complete search history.

(56) References Cited

U.S. PATENT DOCUMENTS

| | | | | |
|---|---|---|---|---|
| 2006/0285152 A1* | 12/2006 | Skillen | ............... | G06F 17/30241 358/1.15 |
| 2007/0061889 A1* | 3/2007 | Sainaney | ............ | G06F 21/6209 726/26 |
| 2007/0208743 A1* | 9/2007 | Sainaney | ............... | G06F 21/604 |
| 2008/0034441 A1* | 2/2008 | Saha | ................... | G06F 17/3089 726/27 |
| 2014/0310641 A1* | 10/2014 | Kornmann | ............ | G06F 3/0481 715/781 |
| 2015/0199837 A1* | 7/2015 | Wang | ...................... | G06T 13/80 345/475 |

OTHER PUBLICATIONS

Adobe Systems Incorporated, "Acrobat JavaScript Scripting Guide", Jul. 19, 2015, pp. 1-280.*
"Basic Document Level (Document Open) Scripts", http://www.pdfscripting.com/public/100.cfm, pp. 1-5, printed from archive dated May 4, 2012.*
Dave Wraight, "Focus on PDF Layers (OCG)", http://www.planetpdf.com/developer/article.asp?ContentID=focus_on_pdf_layers_ocg_, Planet PDF, Feb. 18, 2004, 6 pages, printed from the Internet on Apr. 15, 2014.

(Continued)

*Primary Examiner* — Scott Baderman
*Assistant Examiner* — Asher Kells
(74) *Attorney, Agent, or Firm* — Chen Yoshimura LLP

(57) ABSTRACT

A method for dynamic display of at least one layer in a PDF document, comprising the steps of setting at least one criterion for at least one property of a trigger to change a display state of the at least one layer of the PDF document to another display state of the at least one layer of the PDF document, creating a script that can be processed by a PDF document reader and that contains the at least one criterion for the at least one property of the trigger, and embedding the script in the PDF document, wherein when the PDF document is opened by the PDF document reader, the script causes evaluation of the at least one property for the trigger, and if the at least one criterion for the at least one property of the trigger is met, then the script causes a change of the display state of the at least one layer of the PDF document.

12 Claims, 7 Drawing Sheets

(56) References Cited

OTHER PUBLICATIONS

Thom Parker, "Creating and Using Layers (OCGs) with Acrobat JavaScript", http://acrobatusers.com/tutorials/create_use_layers, Adobe Systems Incorporated, Jul. 7, 2006, 5 pages, printed from the internet on Apr. 15, 2014.

Adobe Systems Incorporated, "JavaScript for Acrobat API Reference", http://www.adobe.com/content/dam/Adobe/en/devnet/acrobat/pdfs/js_api_reference.pdf, Apr. 2007, 769 pages, printed from the internet on Apr. 15, 2014.

Adobe Systems Incorporated, "JavaScript for Acrobat", http://www.adobe.com/devnet/acrobat/javascript.html, 1 page, printed from the internet on Apr. 15, 2014.

Adobe Systems Incorporated, "Adobe Community: SOAP Response", http://forums.adobe.com/thread/286061, 17 pages, printed from the internet on Apr. 15, 2014.

\* cited by examiner

DYNAMIC DISPLAY METHOD OF MULTI-LAYERED PDF DOCUMENTS

BACKGROUND OF THE INVENTION

1. Field of the Invention

This invention relates to a method of displaying digital documents in portable document format (PDF), and in particular, it relates to a method for dynamically displaying multi-layered PDF documents.

2. Description of Related Art

PDF is a popular format for generating, distributing and displaying digital documents. Many PDF documents are generated with one or more embedded optional content group (OCG) layers. For example, a document intended to be read by people reading different languages may have multiple layers where each layer contained text and images in one of many languages. With this multi-layered document, a user may select a particular one of the many languages to display the document in that particular language, without having to download a new version of the document for that language.

It is desirous to provide a method for dynamically displaying PDF documents embedded with multiple layers so that users may choose to display only the contents satisfying certain predetermined criteria.

SUMMARY

The technique of embedding PDF documents with multiple layers makes it possible to have many sets of visible and invisible contents embedded in PDF documents, to show or hide different contents intended for different purposes.

For example, dynamic contents may be embedded in PDF documents based on locations. With the wide use of global positioning system (GPS) enabled devices nowadays, it is much more relevant to serve location based contents, especially in PDF documents. PDF documents can have location-based dynamic contents embedded in layers to create a better user experience by allowing content creators to target audiences by location and modify the display of location-based layers accordingly. One example of location-based use of PDF documents may be to change the language of a PDF document based on the location that the PDF document is opened. Another example of location-based use may be related to electronic vouchers (i.e. electronic coupons) presented in PDF documents, where the location-based layers can show where the voucher can be redeemed, preferably at a location near the user.

For another example, time-centric contents may be embedded in PDF documents to allow the content creator to show/hide contents at desired time thresholds. For example, in an academic environment One example may be showing answers on a test by displaying an "answer layer" in a PDF document for only a limited amount of time, and upon expiration of the time period hiding the answer layer and instead showing a "Void" label layer after the time expiration.

For a further example, electronic books or publications in PDF may have advertising contents embedded in layers. Having commercial advertisement can help reduce the price of the electronic books or publications. If a user does not want to see advertising contents embedded as dynamic layers in an electronic book or publication, the user can choose to pay a higher price so that the advertising layers are hidden from display.

The exemplary embodiments of the present invention are directed to a new and useful method for dynamically displaying PDF documents embedded with multiple layers of various contents. Showing or hiding a particular layer may get triggered by a set of predetermined criteria, including location, timing, access control policy, etc. Depending on whether a particular one of the criteria is triggered, a corresponding layer of a PDF document may be triggered, showing or hiding the contents of that layer of the PDF document.

The features and advantages of the present invention method include increased reach of electronic PDF documents to multiple audiences with contents unique for their location. By storing location-specific contents in multiple layers, a single PDF document can be customized to be used by users of different demographics. Digital document management for electronic distribution can also be simplified with fewer PDF documents to maintain.

The features and advantages of the present invention method also include added control for content creators who can choose how long to show/hide the display of various layers in PDF documents. The time-based dynamic display of multi-layered PDF documents also allow content creators to timely update the content in the PDF documents. For example, displaying a "Void" layer after a certain date on vouchers, or creating a container on an advertisement layer that can have its content updated online after a certain time period.

The features and advantages of the present invention method further include added functionality in printed documents by using dynamic multi-layered PDF document. For example, a user may choose to print any combination of questions, and answers if those have been stored as layers in a PDF document. This can save printing resources such as papers, toners and/or inks.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, one of the exemplary embodiments of the present invention provides a method for dynamic display of at least one layer in a PDF document, comprising the steps of setting at least one criterion for at least one property of a trigger to change a display state of the at least one layer of the PDF document to another display state of the at least one layer of the PDF document, creating a script that can be processed by a PDF document reader and that contains the at least one criterion for the at least one property of the trigger, and embedding the script in the PDF document, wherein when the PDF document is opened by the PDF document reader, the script causes evaluation of the at least one property for the trigger, and if the at least one criterion for the at least one property of the trigger is met, then the script will cause a change of the display state of the at least one layer of the PDF document.

In a further aspect, another one of the exemplary embodiments of the present invention provides a computer software program product that causes a data processing apparatus to perform the above described methods. The computer program product includes a computer usable non-transitory medium (e.g. memory or storage device) having a computer readable program code embedded therein for controlling a data processing apparatus, the computer readable program code configured to cause the data processing apparatus to execute the above described processes.

It is to be understood that both the foregoing general description and the following detailed description are exem-

DETAILED DESCRIPTION OF PREFERRED EMBODIMENTS

Embodiments of the present invention provide a method for dynamically displaying multi-layered PDF documents.

One exemplary embodiment of the present invention provides a process for creating a multi-layered PDF documents with dynamic display settings for each layer based on properties such as location, time, access policy, etc. A stand-alone application, or a plug-in module for an existing PDF document creation application, may be used for this process. The application or plug-in module will generate a PDF script of the dynamic display settings, and embed the PDF script in the multi-layered PDF document. The embedded PDF script can be universally read by commonly used standard PDF readers. When the multi-layered PDF document is opened by a PDF reader, the embedded PDF script is read as well which may or may not modify layers displayed based on the dynamic settings. Based on the script the reader may utilize web-service calls for any required calls such as discerning location from an IP address, getting the current time from a legitimate source, obtaining a document time expiration policy, or getting user access policy. With these property information, the PDF reader can show or hide a particular layer of the PDF document based on the dynamic settings contained in the PDF script.

Figure 1:
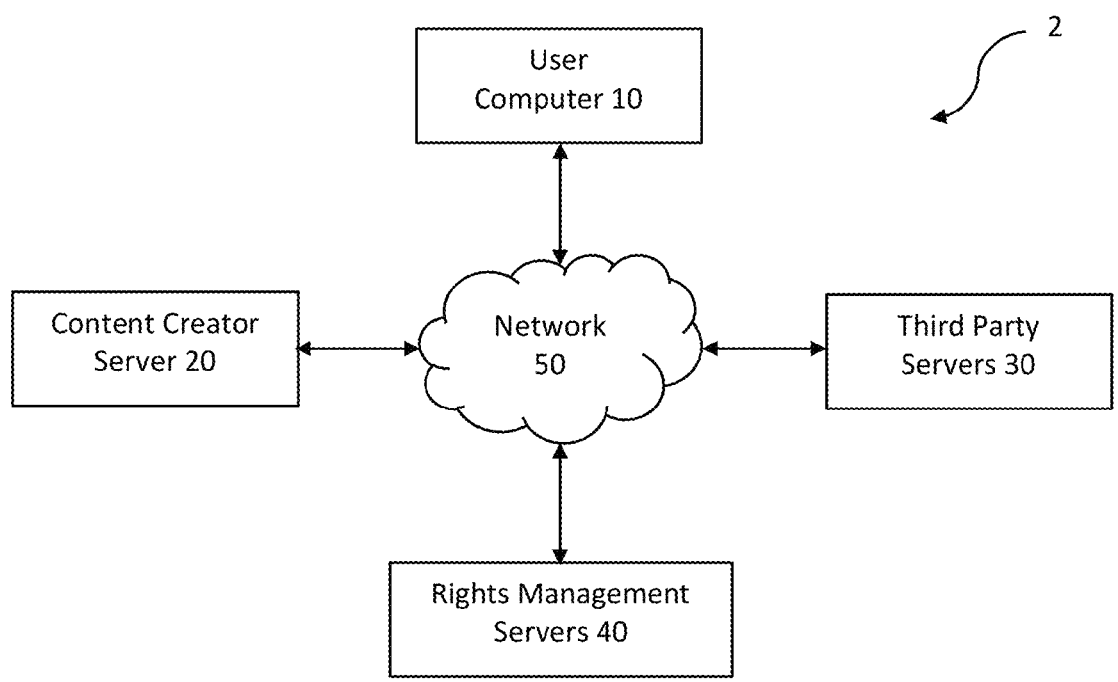
FIG. 1 is a schematic block diagram illustrating an exemplary online environment according to one of the embodiments of the present invention.

Referring to FIG. 1, there is shown a schematic block diagram illustrating an exemplary online system set up or arrangement 2 in which various embodiments of the present invention may be implemented. The exemplary online environment includes a user or customer computer or terminal 10, a content creator server 20 operated by an online digital document production, distribution, storage and/or management service provider such as a publisher, a bookstore, etc., one or more servers 30 operated by third party content or web-service providers, and one or more rights management servers 40 operated by digital rights management systems (RMS) or copyrights management centers, all connected via one or more computer networks 50 such as the Internet or other communication links.

A user or customer may use the computer or terminal 10, or similar suitable devices such as a laptop computer, a tablet computer, an e-reader, or a smart phone, etc., to access the computer network 50 and interact with the content creator or publisher, the third party content or web-service providers, and the RMS or copyrights management center managers. A content creator or publisher may use the server 20 to access the network 50 and interact with the users or customers, the third party content or web-service providers, and the RMS or copyrights management center managers. Likewise, the third party content or web-service providers and RMS or copyrights management center managers may use their respective servers 30 and 40 to access the network 50 and interact with each other, and with the content creator and users.

The content creator or publisher generally can provide an integrated online service via server 20 that allows users to search, purchase, download and/or access PDF documents. The third party content or web-service providers generally can provide online information via their servers 30. The RMS or copyrights management centers generally can provide user access authorization or policy information for particular PDF documents.

Computers and servers 10, 20, 30 and 40 may be computers, server computers, or computer or server systems, such as webservers, where the computer software program(s) and/or application(s) implementing the various processes of the exemplary embodiments of the present invention may be installed and executed.

Typically these computers and servers provide a user interface (UI) or graphic user interface (GUI) to allow users or operators of the computers and servers to interact with the computer software programs and applications to perform various steps of the process.

In this Application the term "server" generally refers to any computer, server, server computer, server instance, computer or server system, data processor, controller, data processing unit or apparatus, or any suitable system, apparatus or device, and any computer software program or application that are installed or executed on such system, apparatus or device, that may be used to implement the methods or carry out the processes provided by the embodiments of the present invention.

A user or customer may access the computers and server 10, 20, 30 or 40 by using computer programs or applications on the user or customer's own computer 10 or on server 20, 30 or 40 that the user or customer can access through the user computer or terminal 10 via the Internet 50.

The physical locations or the commercial relationship among the various components of the online environment shown in FIG. 1 are not important. For example, the RMS server 40 may be located in an educational institution, a copyrights clearing house, a professional print shop, or any suitable commercial establishment.

As mentioned earlier, in one aspect, an exemplary embodiment of the present invention is embodied a computer program product that causes a data processing apparatus to perform the exemplary embodiments of the methods of the present invention. The computer program product includes a computer usable non-transitory medium (e.g. memory or storage device) having a computer readable program code embedded therein for controlling a data processing apparatus, where the computer readable program code is configured to cause the data processing apparatus to execute the process of exemplary embodiments of the present invention.

Figure 2:
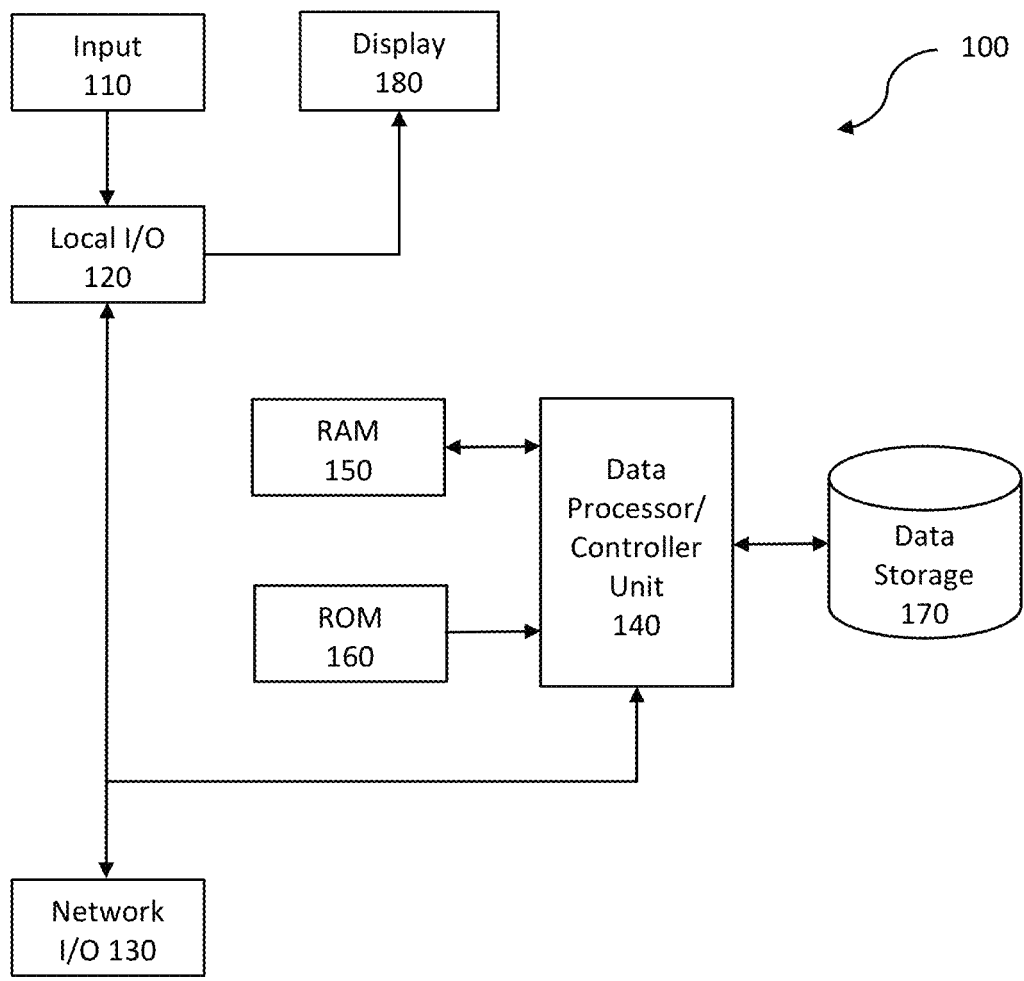
FIG. 2 is a schematic block diagram illustrating an exemplary data processing apparatus such as a computer or server having a data processing unit according to one of the embodiments of the present invention.

Referring to FIG. 2, there is shown a schematic block diagram illustrating an exemplary server 100, whereupon various embodiments of the present invention may be implemented. The server 100 typically includes a user input device 110 including, for example, a keyboard and a mouse. The input device 110 may be connected to the server 100 through a local input/output (I/O) port 120 to enable an operator and/or user to interact with the server 100. The local I/O 120 is also provided for local connections via direct links to other electronic devices such as a file storage, a monitor and/or a printer.

The server 100 typically also has a network I/O port 130 for connection to a computer network such as the Internet, so that the server 100 may remotely communicate with the other computers and servers connected to the computer network.

The server 100 typically has a data processor/controller unit 140 such as a central processor unit (CPU) that controls the functions and operations of the server 100. The data processor/controller unit 140 is connected to various memory devices such as a random access memory (RAM) device 150, a read only memory (ROM) device 160, and a storage device 170 such as a hard disc drive or solid state memory. The storage device 170 may be an internal memory device or an external memory device such as a file storage device.

The computer software program codes and instructions for implementing the various embodiments of the present invention may be installed or saved on one or more of these memory devices. For example, program codes and instructions may be stored in the ROM device 160 and the storage device 170, and the data processor/controller unit 140 may read the program codes and instructions from the ROM device 160 or the storage device 170 and temporarily store them in the RAM device 150 during execution of the software programs. The data processor/controller unit 140 executes the computer software programs to perform the functions and carry out the operations to implement the process steps of the various embodiments of the present invention.

The server 100 typically also includes a display device 180 such as a video monitor or display screen which may be connected to the local I/O 120. The input device 110 and the display device 180 together provide a user interface (UI) which allows a user to interact with the server 100 to perform the steps of the process according to the various embodiments of the present invention.

The input device 110 and the display device 180 may be integrated into one unit, such as a touch screen display unit, to provide a more easy and convenient UI for user interaction with the server 100.

It is understood that the server 100 may be any suitable computer or computer system. Preferably for use, for example, by a content creator, the server 100 may be a webserver. However, for use by a member of the general public, the server 100 may be a desktop computer, a laptop computer, a notebook computer, a netbook computer, a tablet computer, a hand-held portable computer or electronic device, a smart phone, or any suitable data processing apparatus that has suitable data processing capabilities.

Figure 3:
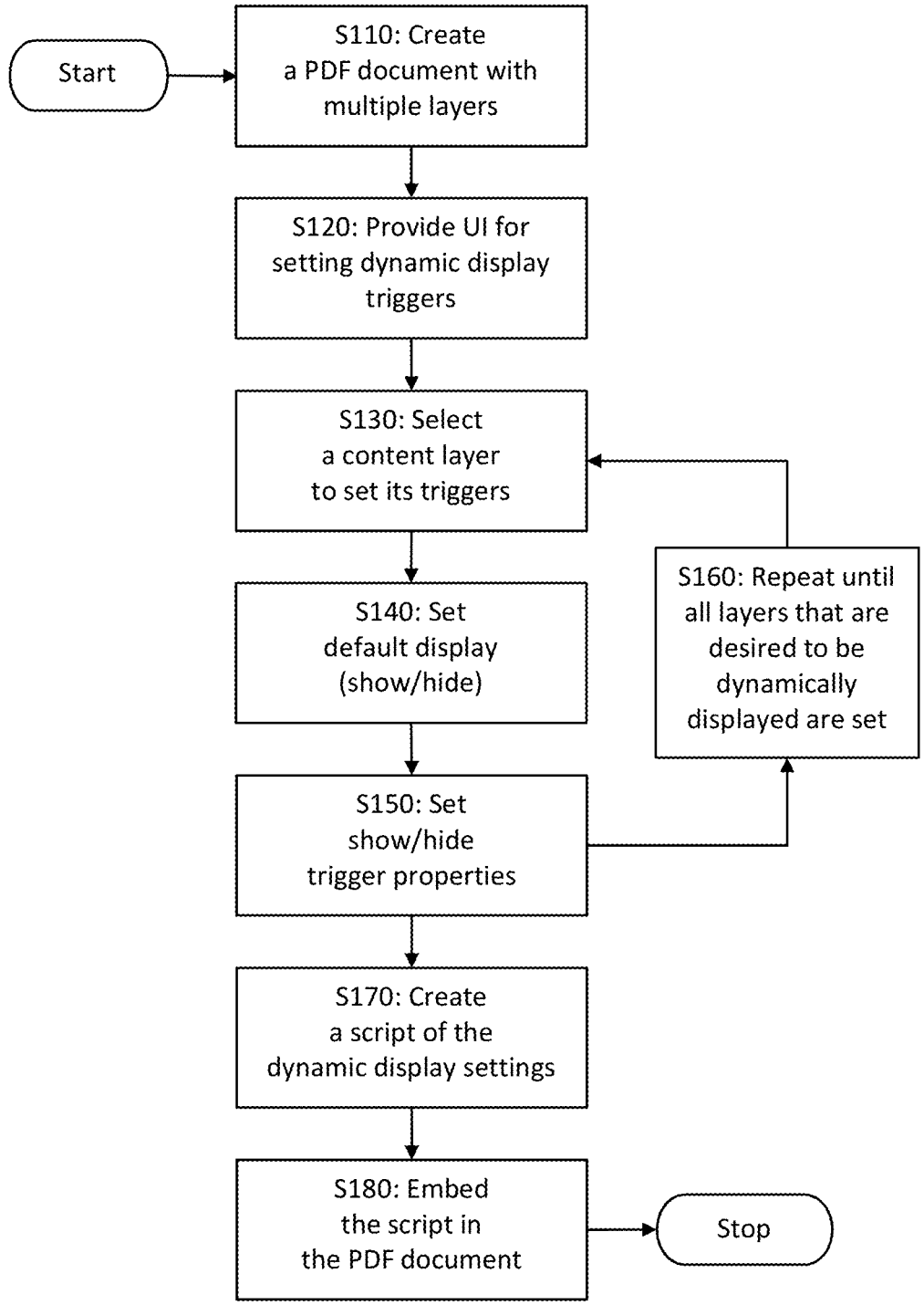
FIG. 3 is a flow chart diagram illustrating an exemplary process for creating multi-layered PDF document with dynamic display settings according to one of the embodiments of the present invention.

Referring to FIG. 3, there is shown a flow chart diagram illustrating an exemplary process for creating multi-layered PDF document with dynamic display settings according to one of the embodiments of the present invention. The description herein of the structures, functions, interfaces and other relevant features, such as digital rights policies, application programming interface (API) for PDF reader programs, etc., may at times incorporates, references or otherwise uses certain information, documents and materials from publicly and readily available and accessible open sources, including, for example: on what is OCG and creating and scripting OCG, etc., see e.g. http://www.planetpdf.com/developer/article.asp?ContentID=focus_on_pdf_layers_ocg_; on creating and manipulating OCG, see e.g. http://acrobatusers.com/tutorials/create_use_layers; on Acrobat JavaScript scripting reference, see e.g. http://www.adobe.com/content/dam/Adobe/en/devnet/acrobat/pdfs/js_api_reference.pdf; on Adobe page for Acrobat Javascript, see e.g. http://www.adobe.com/devnet/acrobat/javascript.html; on examples of soap request from Javascript for Acrobat for talking with web services, see e.g. http://forums.adobe.com/thread/286061. It is noted that several terms used herein, such as Acrobat, Javascript and other terms related thereto, are trademarks of Adobe, Sun Microsystem, etc.

As shown in FIG. 3, the process begins at Step S110, where the content creator creates a PDF document with multiple layers, where the content creator creates a multi-layered PDF document by using a commercially available application, such as Adobe® Illustrator™ CS or Adobe® InDesign™. The multi-layered PDF documents are created to support display settings for each layer based on properties of, for example, location, time, user access policy, etc. Dynamic contents may be incorporated into PDF documents by embedding, for example, Rich Internet Application (RIA) containers into a layer. The process of inserting RIA containers into PDFs is supported by, for example, Adobe®'s LiveCycle® Designer module.

At Step S120 the content creator will use a new stand-alone application, or a plug-in module to the existing PDF document creation application, to provide a UI for setting triggers for dynamic display of the multiple layers of the PDF document, in accordance with the embodiments of the present invention. As an example, the new plug-in for Acrobat® Reader may be written by using Adobe®'s Acrobat® Software Developer Kit (SDK).

Figure 4:
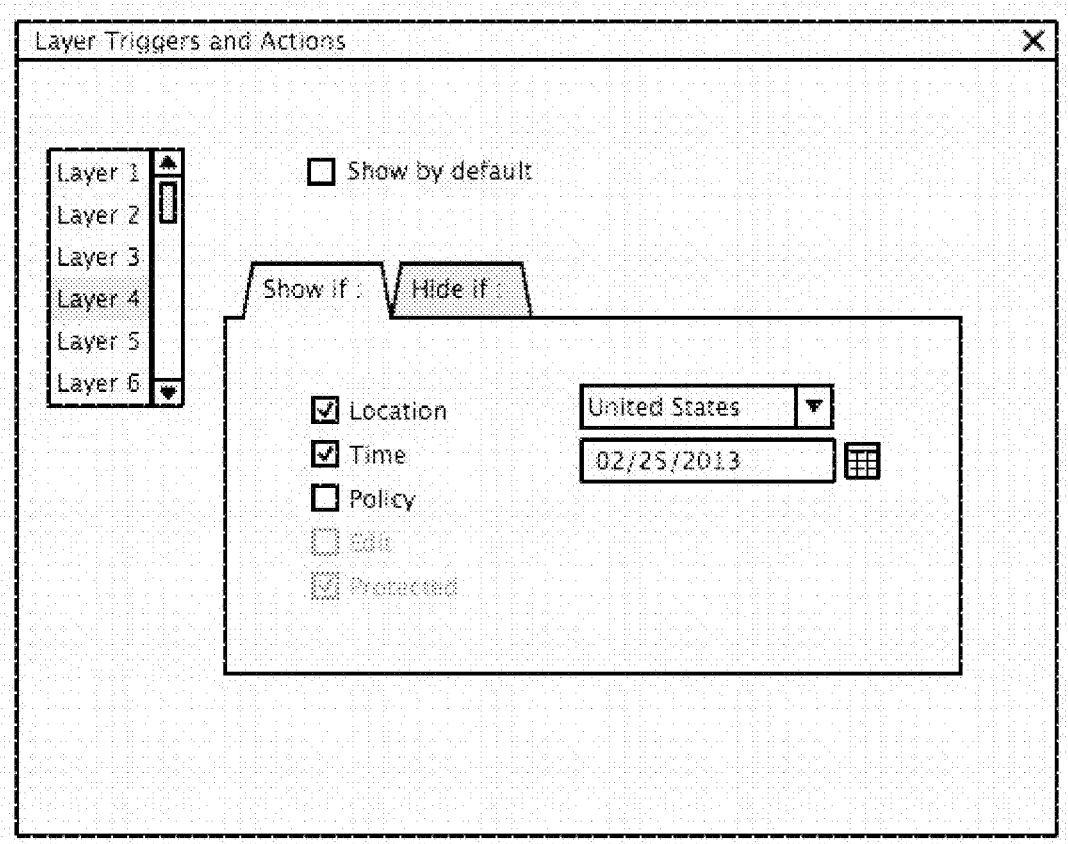
FIG. 4 is a schematic diagram illustrating an exemplary UI display for setting dynamic display triggers of a multi-layered PDF document according to one of the embodiments of the present invention.

Referring to FIG. 4, there is illustrated an exemplary display of the UI preferably shown on a display screen of the content creator server, in accordance with the embodiments of the present invention. By using this UI, an operator of the content creator server can set or modify the dynamic layer display settings for each layer of a multi-layered PDF document based on predetermined properties.

The properties that may trigger dynamic layer display may range vastly. While location, time and policy properties are discussed in detail below, they are merely examples of many possible predetermined properties that may be utilized in the embodiments of the present invention. In fact, the off-loading ability of the computers and servers used by a user opens up many different capabilities as long as the user has an Internet connection.

Referring to FIGS. 3 and 4 together, at Step S130 a content layer is selected to set its dynamic display triggers. As seen in FIG. 4, a display box showing a list of all content layers created in the PDF document is provided at the upper left part of the UI display. A slider or scroll-bar is provided to scroll-down the list so that any layer on the list may be selected by highlighting the layer. For example, as shown in FIG. 4, Layer 4 is selected.

For each layer, the associated data objects include, for example, the layer name, its initial state, i.e., either to be shown or hidden by default, its show triggers, and its hide triggers. For example, as seen in FIG. 4, for Layer 4, its initial state is hidden by default, since the small check box of "show by default" at the upper middle part of the UI display is not checked. However, at Step S140 as shown in FIG. 3, the default display setting of a layer may be set or modified. For example, an operator of the content creator server may make the initial state of Layer 4 to "show by default" by checking the small check box of "show by default" at the upper middle part of the UI display shown in FIG. 4.

The show and hide triggers of each layer may include location trigger, time trigger, policy trigger, etc. The location trigger of a layer contains the criteria to determine if the layer will be shown or hidden at a given location where the PDF document containing the layer is opened. The time trigger of a layer contains the criteria to determine if the layer will be shown or hidden before a given expiration time or due date, and/or for how long the layer will be shown or hidden, when the PDF document containing the layer is opened. The policy trigger of a layer contains the criteria to determine if the layer will be shown or hidden under an access policy for a given user who opens the PDF document containing the layer. If a layer has no show/hide trigger, then it will be shown or hidden according to its initial show/hide state.

For example, as seen in FIG. 4, for Layer 4, its triggers for showing the layer include location and time triggers. The property for the location trigger is set to "United States", and the property for the time trigger is "Feb. 25, 2013", so that if the PDF document is opened at a location within the United States on or before Feb. 25, 2013, then Layer 4 will be shown. At Step S150 shown in FIG. 3, the show/hide triggers and their properties of the selected layer can be set or modified.

At Step S160 of FIG. 3, the above described steps S130 through S150 may be repeated for all layers that are desired or required to be dynamically displayed. It is not necessary to go through all the layers to set their dynamic display triggers and their properties. Rather, the content creator only needs to go through the layers for which dynamic display are desired or required.

At Step S170 of FIG. 3, a dynamic display settings script is generated or created after the show/hide triggers and their properties of all layers (that are desired or required to be dynamically displayed) have been set. This script is generated or created by the new stand-alone application or plug-in module at the content creator server, in a scripting language that a commonly available standard PDF reader can run when the PDF document is opened, and that can also dynamically control the appearance of layers in the PDF document. For example, the new stand-alone application or plug-in module for Acrobat® Reader provided in accordance with the embodiments of the present invention may generate automated codes containing the settings of the triggers and their properties for the dynamic display setting script in JavaScript® (JS) for Acrobat®.

The dynamic display setting script will contain data objects for managing the display of the layers. For example, it may contain data objects that define or indicate whether location, time and/or access policy need to be determined when the PDF document is opened. It may also contain web-service information which is needed to set up a connection for retrieval of location, time and/or access policy information. It may further contain data objects for storing location, time and/or access policy information retrieved from the web-services. It may even contain a constant time for comparing all timers needed for showing/hiding the layers.

At Step S180 of FIG. 3, the dynamic display setting script is embedded in the PDF document, so that it can be processed when the PDF document is opened by a PDF document reader such as Adobe®'s Acrobat® Reader or Acrobat®'s Acrobat® Pro, which allows JS to run and correctly display the multiple layers of the PDF document.

Steps S110 through S180 are preferably performed at the content creator server. Steps S120 through S180 are performed by executing the new stand-alone application or plug-in module provided in accordance with the embodiments of the present invention, as described above.

Figure 5:
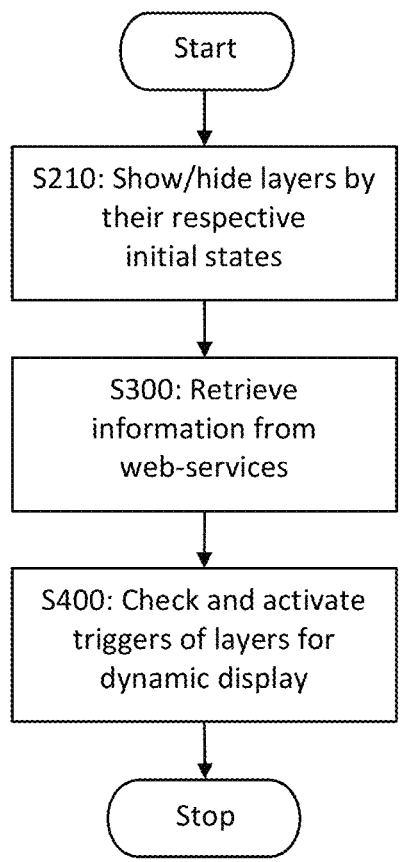
FIG. 5 is a flow chart diagram illustrating an exemplary process for controlling the dynamic display of multi-layered PDF documents according to another one of the embodiments of the present invention.
Figure 6:
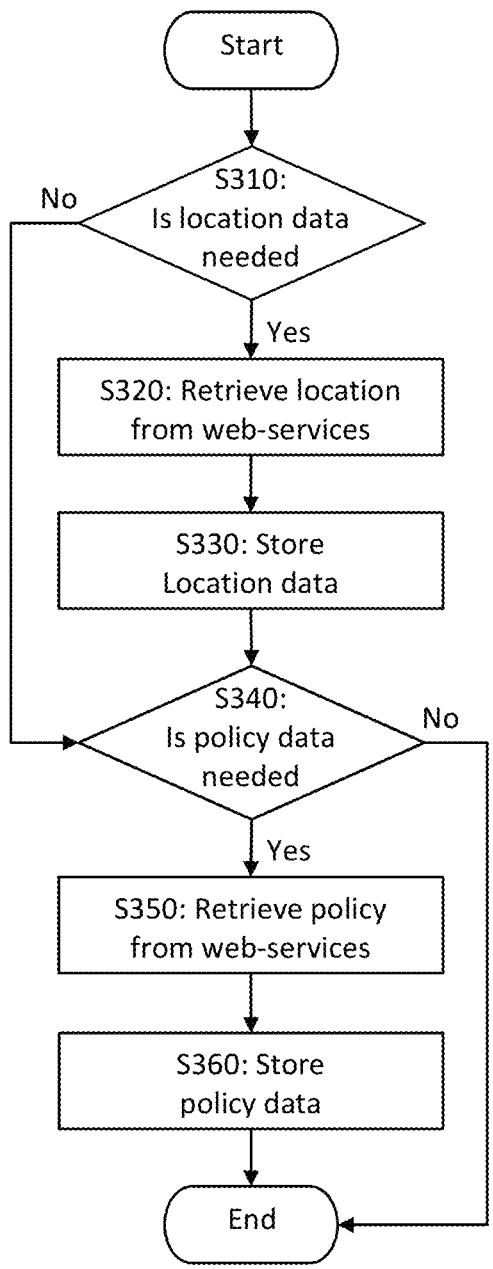
FIG. 6 is a flow chart diagram illustrating one portion of the exemplary process shown in FIG. 5.
Figure 7:
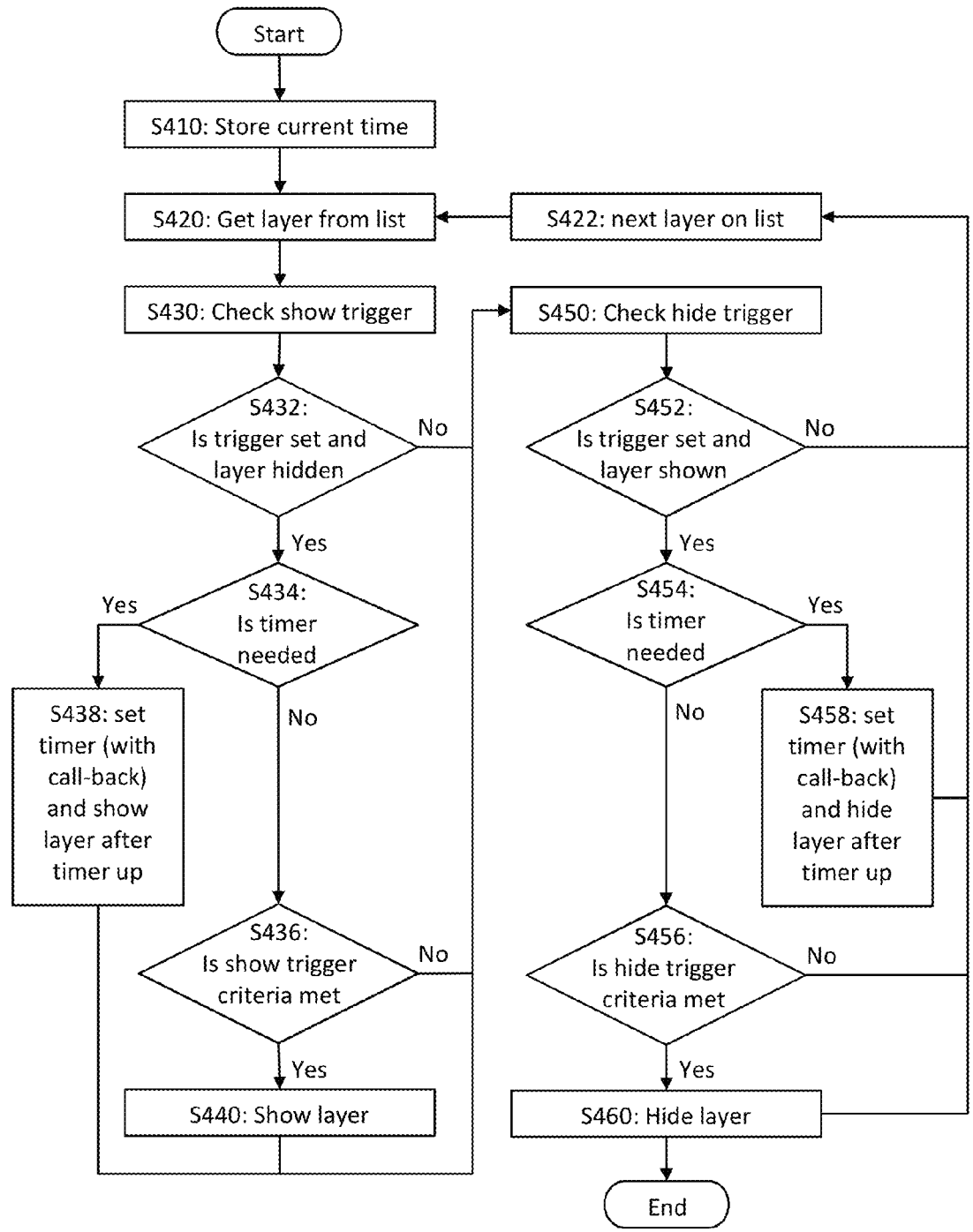
FIG. 7 is a flow chart diagram illustrating another portion of the exemplary process shown in FIG. 5.

Referring to FIGS. 5 through 7, there is illustrated an exemplary process for controlling the dynamic display of multi-layered PDF documents. When a multi-layered PDF document with the embedded dynamic display settings script is opened by a PDF reader, the script will be processed, and the PDF reader will allow the script to run to perform the steps shown in FIGS. 5 through 7. Usually a user may open a multi-layered PDF document with a PDF reader installed and executed on the user's computer, so the steps shown in FIGS. 5 through 7 are typically carried out on the user's computer. Nonetheless these steps are performed as a result of running the embedded script created by the content creator server, which script contains the data objects needed for control the dynamic display of the multiple layers in the PDF document.

Referring to FIG. 5, at Step S210 the layers of the PDF document are shown or hidden according to their initial states respectively. For example, for Layer 4 shown in FIG. 4, its initial state is hidden by default. So initially at Step S210, Layer 4 of the PDF document will be hidden.

Referring back to FIG. 5, at Step 300, the dynamic display settings script is allowed to run to retrieve data from web-services. Data is retrieved from web-services if it is required for information such as location, user access policy, etc. Details of Step S300 will be described later with reference to FIG. 6.

As Step 400, once the required information is retrieved, the dynamic display settings script is allowed to run to check and activate triggers of layers for their dynamic display. Each layer will be shown or hidden in accordance to the criteria based on the trigger properties contained in the dynamic display settings script. If the criteria include a time-based trigger, then a timer is activated for that trigger. Again, details of Step S300 will be described later with reference to FIG. 7.

Steps S210 through S400 are preferably executed when the PDF document is opened by a PDF reader. Optionally some or all of the steps may be executed at other times, for example when a page of the PDF document comes to view, or during other events related to viewing or otherwise using the PDF document.

Referring to FIG. 6, there are shown the detailed steps of Step S300 of FIG. 5 as mentioned above, where the dynamic display setting script embedded in a PDF document is processed by a PDF reader when the PDF document is opened by the reader. If at Step S310 it is found that the script contains data objects that indicate that location data needs to be determined, then at Step S320 the script calls upon or sends a request to a web-service, which will provide location data to back to the script. For example, the web-service may intercept the IP address or GPS data of the user's computer from which the script calls or sends the request, which may be used to determine the general vicinity of the caller or sender. The web-service then sends back the location information, such as the name of the country or city where the user is located, and at Step S330 the script stores such location information for later use in determining the dynamic display settings.

Likewise, if at Step S340 it is found that the script contains data objects that indicate that user access policy data needs to be determined, then at Step S350 the script calls upon or sends a request to a web-service provided by a RMS provider or copyrights center, which will provide details on what layers are supposed to be shown/hidden based on the policy defined for the user. Any RMS or copyrights center that can host user policies will suffice as long as it can handle authentication/authorization based on web service communication protocols such as the Simple Object Access Protocol (SOAP). At Step S360 the script stores such user policy information for later use in determining the dynamic display settings.

Referring to FIG. 7, there are shown the detailed steps of Step S400 of FIG. 5 as mentioned above. At Step S410 a current time is obtained from a web-service and stored as a data object of the script. This because that there may be a strict requirement on ensuring that the proper time is maintained or enforced, which means that a time server needs to be contacted via a web-service call from the script and that call will return an accurate current time.

Continuing on at Step S420, one of the layers is picked from the layer list which is also a data object of the script. For the layer that is being looked upon, at Step S430 the show trigger criteria or properties of the layer are examined or evaluated.

At Step S432 it is checked whether any show trigger is set and the layer is hidden in its initial state. If no show trigger is set and the layer is shown in its initial state, then the process proceeds to examine or evaluate the hide trigger criteria or properties at Step S450. However if there is show trigger set and the layer is hidden in its initial state, then at Step S434 it is checked whether a timer is needed, i.e., whether the showing of the layer is time sensitive or time-based. If a timer is not needed, then at Step S436 it is checked whether the show trigger criteria or properties are met. But if a timer is indeed needed, then at Step S438 a timer is set with a call-back. The call-back will be called when the timer is up to show the layer as intended.

If the result of Step S436 is that the show trigger criteria or properties are met, then at Step S440 the layer is shown. Otherwise the process proceeds to examine or evaluate the hide trigger criteria or properties at Step S450. For example, if the location criterion or property is set at "United States", and the script call to a web-service returns an indication that the IP address of the user computer (from which the script call is made when the PDF document is opened by a reader running on that user computer) indicates that the user computer is indeed located in the United State, then the location triggered layer will be shown.

At Step S450 the hide trigger criteria or properties of the layer are examined or evaluated. At Step S452 it is checked whether any hide trigger is set and the layer is shown in its initial state. If no hide trigger is set and the layer is hidden in its initial state, then the process proceeds to process the next layer on the list at Step S422. However if there is hide trigger set and the layer is shown in its initial state, then at Step S454 it is checked whether a timer is needed, i.e., whether the hiding of the layer is time sensitive or time-based. If a timer is not needed, then at Step S456 it is checked whether the hide trigger criteria or properties are met. But if a timer is indeed needed, then at Step S458 a timer is set with a call-back. The call-back will be called when the timer is up to hide the layer as intended.

If the result of Step S456 is that the hide trigger criteria or properties are met, then at Step S460 the layer is hidden. Otherwise the process proceeds to process the next layer on the list at Step S422. Of course the process will end after all layers on the layer list are processed.

The various embodiments of the present invention method have many advantages. For example, dynamically displaying multi-layered PDF documents increases the reach of PDF documents to wider demographic audiences with contents customized for the location of opening the PDF documents. By storing location-based contents in multiple layers, a single PDF document can be tailored for use by users of different geographies. Electronic distribution of PDF document is also simplified with fewer PDF documents to manage.

In addition, dynamically displaying multi-layered PDF documents adds greater control for content creators to decide how long the display of various layers in PDF documents may be shown or hidden. This time-based display control of content layers also means that the content creators may make timely content update. For example, a "Void" layer displayed on a voucher after a certain period of time makes the voucher more time sensitive, and a time-based container created on an advertisement layer allows its content be updated online periodically.

Moreover, dynamically displaying multi-layered PDF documents provides more functionality in printed PDF documents. For example, when a user prints a document, the user can choose to print any combination of questions and answers if they are stored as layers in a PDF document. This results in reduced use of valuable printing resources.

It will be apparent to those skilled in the art that various modification and variations can be made in the method and related apparatus of the present invention without departing from the spirit or scope of the invention. Thus, it is intended that the present invention cover modifications and variations that come within the scope of the appended claims and their equivalents.

What is claimed is:

1. A method for dynamic display of at least one layer in a PDF document, comprising the steps of:
setting, via a server, a criterion based on a geographic location of a PDF document reader for a trigger to change a display state of the at least one layer of the PDF document to another display state of the at least one layer of the PDF document;
creating, via the server, a script that can be processed by the PDF document reader and that contains the location-based criterion for the trigger; and
embedding, via the server, the script in the PDF document, wherein when the PDF document is opened by the PDF document reader, the script causes evaluation of the location-based criterion for the trigger, and if a geographic location of the PDF document reader when the PDF document is opened satisfies the location-based criterion for the trigger, then the script causes a change of the display state of the at least one layer of the PDF document.

2. The method of claim 1, wherein the display state of the at least one layer of the PDF document is showing the at least one layer of the PDF document, and the other display state of the at least one layer of the PDF document is hiding the at least one layer of the PDF document.

3. The method of claim 1, wherein the display state of the at least one layer of the PDF document is hiding the at least one layer of the PDF document, and the other display state of the at least one layer of the PDF document is showing the at least one layer of the PDF document.

4. The method of claim 1, wherein the location-based criterion specifies a specific geographic area.

5. The method of claim 1, wherein when the PDF document is opened by the PDF document reader, the script further causes requesting at least one other server via a computer network to provide information for evaluation of the location-based criterion for the trigger.

6. The method of claim 1, wherein when the PDF document is opened by the PDF document reader, the script further causes retrieving information from at least one other server via a computer network for evaluation of the location-based criterion for the trigger.

7. A computer program product comprising a non-transitory computer usable medium having a computer readable code embodied therein for controlling a data processing apparatus, the computer readable program code configured to cause the data processing apparatus to execute a process for dynamic display of at least one layer in a PDF document, the process comprising the steps of:

setting a criterion based on a geographic location of a PDF document reader for a trigger to change a display state of the at least one layer of the PDF document to another display state of the at least one layer of the PDF document;

creating a script that can be processed by the PDF document reader and that contains the location-based criterion for the trigger; and embedding the script in the PDF document, wherein when the PDF document is opened by the PDF document reader, the script causes evaluation of the location-based criterion for the trigger, and if a geographic location of the PDF document reader when the PDF document is opened satisfies the location-based criterion for the trigger, then the script causes a change of the display state of the at least one layer of the PDF document.

8. The computer program product of claim 7, wherein the display state of the at least one layer of the PDF document is showing the at least one layer of the PDF document, and the other display state of the at least one layer of the PDF document is hiding the at least one layer of the PDF document.

9. The computer program product of claim 7, wherein the display state of the at least one layer of the PDF document is hiding the at least one layer of the PDF document, and the other display state of the at least one layer of the PDF document is showing the at least one layer of the PDF document.

10. The computer program product of claim 7, wherein the location-based criterion specifies a specific geographic area.

11. The computer program product of claim 7, wherein when the PDF document is opened by the PDF document reader, the script further causes requesting at least one other computer via a computer network to provide information for evaluation of the location-based criterion for the trigger.

12. The computer program product of claim 7, wherein when the PDF document is opened by the PDF document reader, the script further causes retrieving information from at least one other computer via a computer network for evaluation of the location-based criterion for the trigger.

\* \* \* \* \*